(12) United States Patent
Blomqvist et al.

(10) Patent No.: US 8,062,013 B2
(45) Date of Patent: Nov. 22, 2011

(54) DEVICE FOR INTERNAL COOLING OF EXTRUDED THERMOPLASTICS PIPES

(75) Inventors: Gunnar Blomqvist, Helsingby (FI); Jonas Holmlund, Gamla Vasa (FI); Stefan Slotte, Vasa (FI)

(73) Assignee: Oy KWH Pipe AB, Vasa (FI)

( * ) Notice: Subject to any disclaimer, the term of this patent is extended or adjusted under 35 U.S.C. 154(b) by 637 days.

(21) Appl. No.: 11/917,694

(22) PCT Filed: Jun. 13, 2006

(86) PCT No.: PCT/FI2006/050253
§ 371 (c)(1),
(2), (4) Date: Jul. 21, 2008

(87) PCT Pub. No.: WO2006/134228
PCT Pub. Date: Dec. 21, 2006

(65) Prior Publication Data
US 2009/0139695 A1 Jun. 4, 2009

(30) Foreign Application Priority Data
Jun. 15, 2005 (FI) .................................. 20050634

(51) Int. Cl.
*B29C 47/88* (2006.01)

(52) U.S. Cl. ..................... 425/72.1; 425/192 R; 425/380

(58) Field of Classification Search .................. 425/72.1, 425/192 R, 380, 461
See application file for complete search history.

(56) References Cited

U.S. PATENT DOCUMENTS

| 3,329,999 A | * | 7/1967 | Cook ............................ 425/72.1 |
| 3,445,891 A | * | 5/1969 | Thordarson ................... 425/72.1 |
| 3,810,725 A | * | 5/1974 | Trub et al. ..................... 425/72.1 |
| 3,990,828 A | * | 11/1976 | Reifenhauser .............. 425/326.1 |
| 5,525,289 A | | 6/1996 | Lupke et al. |
| 5,587,126 A | * | 12/1996 | Steketee, Jr. .................. 264/568 |
| 6,418,732 B1 | | 7/2002 | Klane et al. |

(Continued)

FOREIGN PATENT DOCUMENTS
DE 1504804 9/1969
(Continued)

OTHER PUBLICATIONS

Extended European Search Report issued in related European Application No. 06755415.4 on Jul. 21, 2011.

*Primary Examiner* — Yogendra Gupta
*Assistant Examiner* — Joseph Leyson
(74) *Attorney, Agent, or Firm* — Connolly Bove Lodge & Hutz LLP

(57) ABSTRACT

The invention relates to a method and a device for cooling an extruded thermoplastics pipe (1) by directing a gaseous cooling medium tangentially towards the inner surface of the thermoplastics pipe (1) along its whole periphery, whereby the interior of the thermoplastics pipe (1) is divided by means of a protecting pipe (8) into an outer ring-shaped flow channel (9) for the cooling medium along the inner surface of the thermoplastics pipe (1), and a central return channel (10) through which a part of the cooling medium is intended to be sucked back influenced by the flow of cooling medium in the outer ring-shaped flow channel (9), and to be redirected towards the inner surface of the thermoplastics pipe (1). The invention is characterized in that the cooling medium is air, and that there is a cooling equipment (6) mounted in the return channel (10), whereby temperature and flow rate at least of the cooling water led to the cooling equipment (6) and possibly also of the cooling air which is fed into the thermoplastics pipe (1) are adjusted and controlled based on dimension and extrusion rate of the thermoplastics pipe (1) being manufactured.

9 Claims, 4 Drawing Sheets

FOREIGN PATENT DOCUMENTS

| | | |
|---|---|---|
| DE | 25 23 975 A1 | 12/1976 |
| DE | 2652641 | 4/1978 |
| EP | 0231637 | 8/1987 |
| GB | 828851 | 2/1960 |
| GB | 1104079 | 2/1968 |
| GB | 1378583 | 12/1974 |
| WO | WO-94/05482 A1 | 3/1994 |
| WO | WO-2004/096524 | 11/2004 |

* cited by examiner

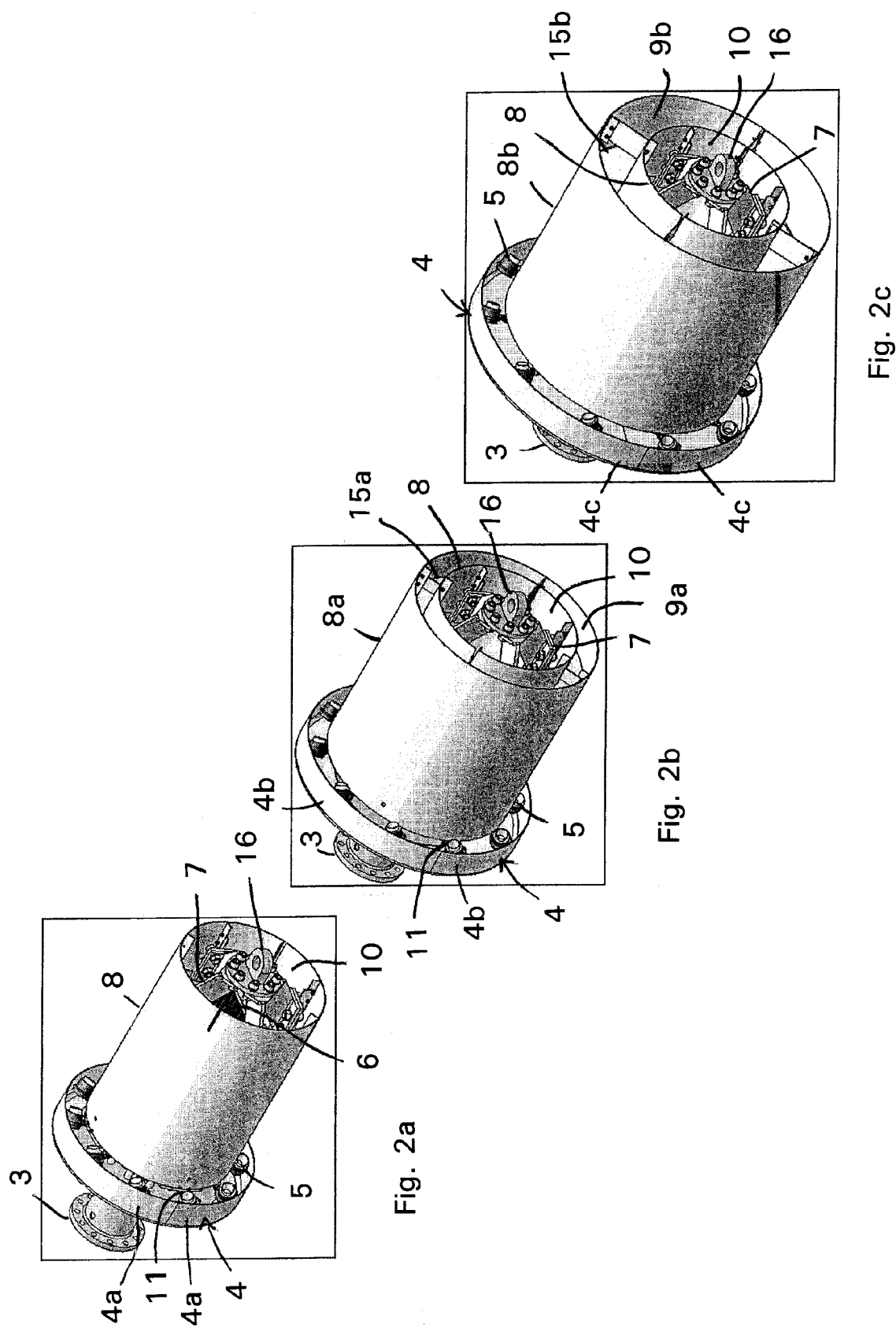

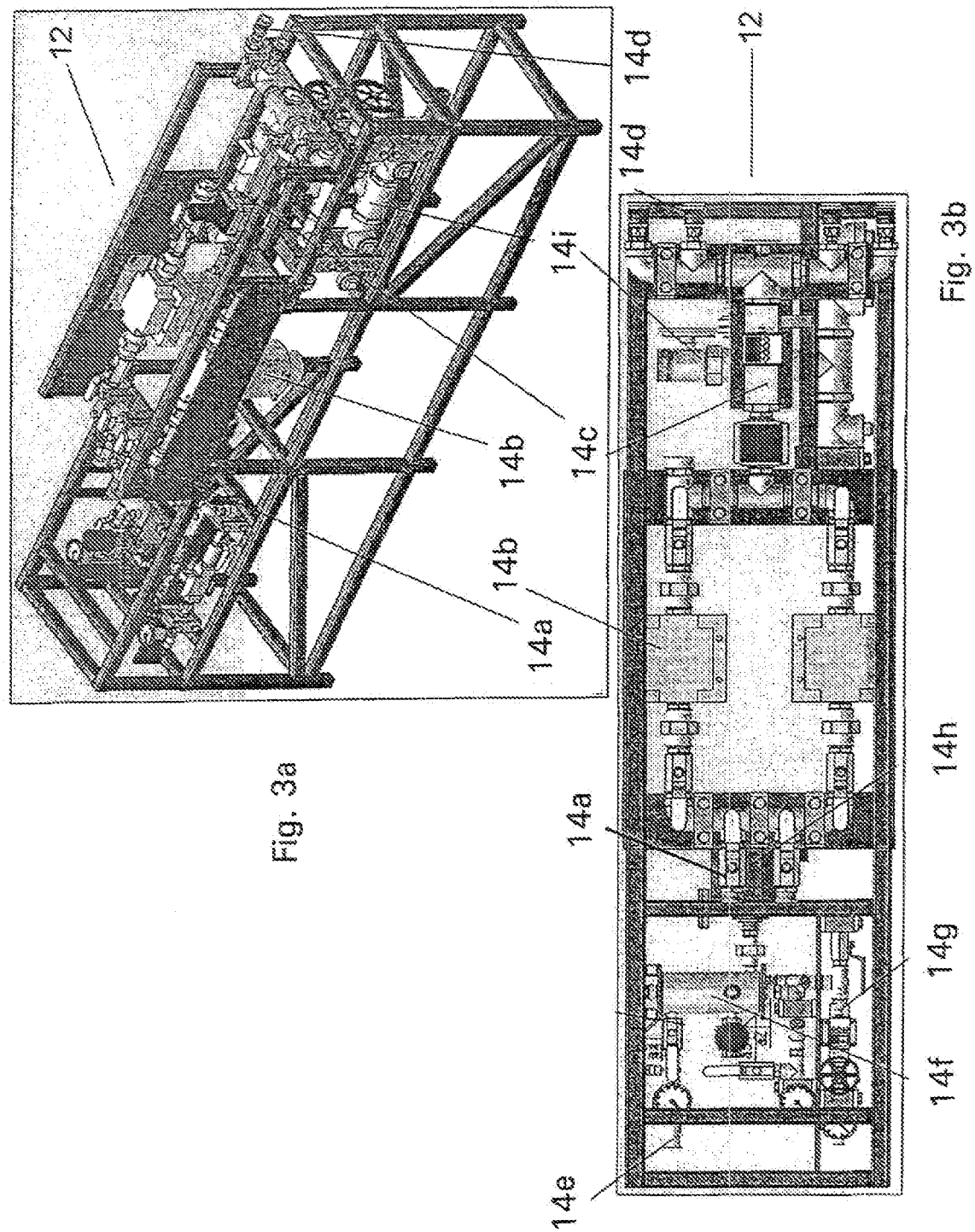

DEVICE FOR INTERNAL COOLING OF EXTRUDED THERMOPLASTICS PIPES

RELATED APPLICATIONS

This application is a national stage application (under 35 U.S.C. §371) of PCT/FI2006/050253 filed Jun. 13, 2006, which claims benefit of Finnish application 20050634 filed Jun. 15, 2005, disclosure of which is incorporated herein by reference.

TECHNICAL FIELD

This invention relates to a method for cooling an extruded thermoplastics pipe (1), which on exiting an extruding tool is lead through a calibrator and one or several cooling baths, whereby at the entry of the thermoplastics pipe into the calibrator, a gaseous cooling medium is directed tangentially towards the inner surface of the thermoplastics pipe along its whole periphery, whereby the interior of the thermoplastics pipe is divided by means of a protecting pipe into an outer ring-shaped flow channel for the cooling medium along the inner surface of the thermoplastics pipe, and a central return channel through which a part of the cooling medium is intended to be sucked back influenced by the flow of cooling medium in the outer ring-shaped flow channel, in order to be redirected against the inner surface of the thermoplastics pipe. The invention relates also to a device for carrying out the method.

BACKGROUND ART

In extruding thermoplastics pipes, plastics granulate is melted in an extruder to a homogeneous melt. Heat required for melting of the plastic is produced in the beginning of the process by means of electrical heating elements on the outer surface of the extruder cylinder. In addition, friction heat is produced during the extrusion by interaction between extruder screw, cylinder and the plastics granules. After the process has reached a stable state, the granules will melt mainly by friction heat. The molten mass is pressed through a heated tool to form a pipe profile of predetermined geometry. This molten pipe profile is formed to its final geometry by cooling it in a calibrator (sleeve) having a predetermined inner diameter determining the final diameters of the extruded pipe. This is carried out using vacuum or pressure calibration.

In vacuum calibration the pipe is sucked against a perforated surface of the calibrator by means of vacuum, which calibrator is arranged inside a cooling tank at a pressure lower than the atmospheric pressure prevailing also inside the pipe.

In pressure calibration an overpressure is created inside the pipe to press the pipe against the surface of the calibrator inside a cooling tank with normal pressure. This takes place by closing the interior of the pipe with a plug at the end of the pipe as well as by pressuring the closed space by means of pressurized air lead through the extruding tool.

In both calibration versions the pipe is typically cooled by spraying the outer surface of the pipe with cooling water in one or several calibration tanks. The pipe has to be cooled sufficiently in order to be able to be handled along the process line in marking, drawing and cutting devices. A certain stability is also required to enable particularly large-sized, thick-walled pipes to withstand their own weight without being deformed during their handling and storing directly after the extrusion.

The production rate of the aforesaid thermoplastics pipes is often determined by the cooling capacity of the line. A part of the heat is transferred inwards through the inner surface of the pipe, but a major part of the melting heat is transferred by water cooling at the outer surface.

Cooling concepts used in existing extrusion lines encounter a number of potential problems. In manufacturing thick-walled pipes the portion of plastics still in molten condition may be so large that its weight exceeds the strength of molten plastics directly after the die and inside the calibrator. Due to this, molten plastics flows from the upper side of the pipe towards its lower part, thereby resulting in non-uniform wall thickness. The pipe wall will become thinner in the upper part of the pipe than at the sides and in the lower part of the pipe. This can be compensated by unevenly centering the slot in the extruding tool, through which the molten plastics flows. The slot is thus arranged to be largest on the top, thereby obtaining a final product with a relatively uniform wall thickness distribution. Since the product tolerances define minimum and maximum wall thicknesses as well as maximum values of faulty eccentric running, the aforesaid method leads to material losses and reject.

A further problem arising during the extrusion is that thermoplastics material oxidizes when the inner surface of the pipe for a long time is exposed to hot oxygen-rich atmosphere. This results in impaired mechanical properties, such as pressure strength in pressure pipes designed e.g. for water or gas pipe lines. A possibility to counteract this is to introduce, for example, an inert gas into the pipe, which, on the other hand, leads to increased production costs.

Cooling of the pipe only from the outside affects also the inner stresses in the pipe wall, resulting in a stress profile, which leads, e.g. when the pipe is cut, to lacing of the pipe end.

A method and a device according to the preamble is previously known from US patent specification U.S. Pat. No. 6,418,732, wherein solid and gaseous carbon dioxide is used as cooling medium. This leads to a too low temperature of the cooling medium resulting in considerable condensing water problems inside the thermoplastics pipe which may cause serious defects in the pipe wall. Further the process according to this previously known process is relatively cost consuming.

SUMMARY OF INVENTION

An object of the present invention is to eliminate these problems, which is achieved by a method which is characterized in that the cooling medium is air, and the part of the air which is sucked back through the return channel is re-cooled by means of a cooling equipment mounted in the return channel, whereby temperature and flow rate at least of the cooling water led to the cooling equipment for cooling down the cooling air circulating in the thermoplastics pipe, and possibly also of the cooling air which is fed into the thermoplastics pipe are adjusted and controlled based on dimension and extrusion rate of the thermoplastics pipe being manufactured. By this method the thermoplastics pipe is effectively and economically cooled both internally by means of said cooling air jets and externally by means of water jets and water baths. This procedure enables a faster and more uniform cooling of the pipe wall, which can be utilized e.g. to increase the rate of extrusion without affecting the quality of the produced pipe.

The cooling air is suitably directed to flow spirally through the ring-shaped flow channel to provide effective and uniform cooling of the pipe wall and complete mixing of the air in the thermoplastics pipe.

In vacuum calibration the whole front end of the thermoplastics pipe is left open but in pressure calibration the interior of the thermoplastics pipe is closed in direction towards the open end of the pipe, whereafter an overpressure is maintained in the thermoplastics pipe by feeding pressurized air into the thermoplastics pipe simultaneously as excessive cooling air is allowed to flow out of the pipe through the extruding tool to balance the pressure in the thermoplastics pipe and to simultaneously maintain the cooling air circulation in the thermoplastics pipe.

The invention relates also to a device for cooling an extruded thermoplastics pipe, which on exiting an extruding tool is arranged to pass through a calibrator or one and several baths, which device is connected to the extruding tool coaxially with a ring-shaped slot of the extruding tool, and comprises a cylindrical connecting piece, a guide bush, which is adapted to the inner dimension of the thermoplastics pipe and closed against the extruding tool, a plurality of means mounted annularly inside the cylindrical side wall of the guide bush in order to direct gaseous cooling medium jets mainly tangentially towards the inner surface of the thermoplastics pipe, a cylindrical protecting pipe arranged to form a ring-shaped flow channel along the inner surface of the thermoplastics pipe, and a central return channel, ending in the guide bush, for a part of the cooling medium flown through the ring-shaped flow channel to be returned to said means influenced by suction effect of the cooling medium flows in order to be redirected towards the inner wall of the thermoplastics pipe. The device is characterized in that the cooling medium is air, whereby a cooling equipment is arranged in the return channel, said cooling equipment comprising at least one heat exchanger mounted in a central frame projecting from the connecting piece and the guide bush, and that each of the means for directing the cooling air flows are rotatably mounted in its own telescopic shaft projecting essentially in radial direction from the central frame of the device enabling radial movement and rotation of each element around its telescopic shaft, so that said elements are adjustable to a desired position inside the guide bush of the device and are suitably so directed that the cooling air flowing out of the elements is caused to flow spirally through the ring-shaped flow channel between the protecting pipe of the device and the inner pipe wall which is to be cooled. The elements to redirect the cooled pressurized air flows are suitably in the form of air actuators of ejector type providing effective suction effect on the pressurized air in the return channel, but also the use of air exhausters, dies with pressurized air or the like is possible.

Preferably, an external control unit is arranged to control the operations of the device via pipe lines lead through the connecting piece of the device and the extruding tool, which control unit comprises means for receiving pressurized air, cleaning the same and to control the supply of pressurized air into the air actuators and means for cooling and controlling the flow of cooling medium, preferably water, into the heat exchangers of the device for cooling the cooling air circulating in the pipe.

In order to make the device adaptable for internal cooling of pipes of different sizes, the guide bush of the device is suitably made of two or several easily replaceable segments or adapter plates.

In a basic embodiment the device is provided with a guide bush adapted to thermoplastics pipes of the smallest dimension class requiring internal cooling. When the device is intended to be adapted for internal cooling of thermoplastics pipes of larger dimension, the ordinary adapter plates are replaced with adapter plates of larger dimension, the means for directing the cooling air jets are radially moved by their telescopic shafts towards the cylindrical wall of the new guide bush, and a second protecting pipe is detachably applied to the top of the ordinary protecting pipe, which second protecting pipe suitably comprises means for closing the annular space between the ordinary protecting pipe and said second protecting pipe.

In addition to the ordinary equipment, a suitable additional set of adapter plates and protecting pipes is a set of adapter plates with a related detachably applicable protecting pipe for medium-sized pipes and a second set of adapter plates with a related detachably applicable protecting pipe for large pipes.

In order to prevent condensate from the plastics from dropping down onto the pipe wall, a drip pan is arranged in the lower part of the front end of the protective pipe.

Preferably the front end of the device is provided with means for connecting a wire or the like, the other end of which being fixed to a pressure plug located further ahead in the pipe when internal cooling is carried out using pressure calibration by maintaining an over-pressure inside the pipe. In order to balance the pressure inside the pipe, the space inside the thermoplastics pipe is brought into contact with an adjustable outlet valve via a pipe drawn through the connecting piece of the device and the extruding tool to control the evacuation of excessive cooling air.

SUMMARY OF DRAWINGS

In the following the invention is described in more detail with reference to the attached drawing where FIG. 2a-2c show in perspective an example of how the device according to the invention is applicable to internal cooling of pipes of unequal size, FIG. 2d shows the device according to FIG. 2a provided with a drip pan and FIGS. 3a and 3b show an example of a control unit of the device according to the invention in a perspective and top view, respectively.

BEST AND VARIOUS MODES FOR CARRYING OUT DISCLOSURE

Figure 1:
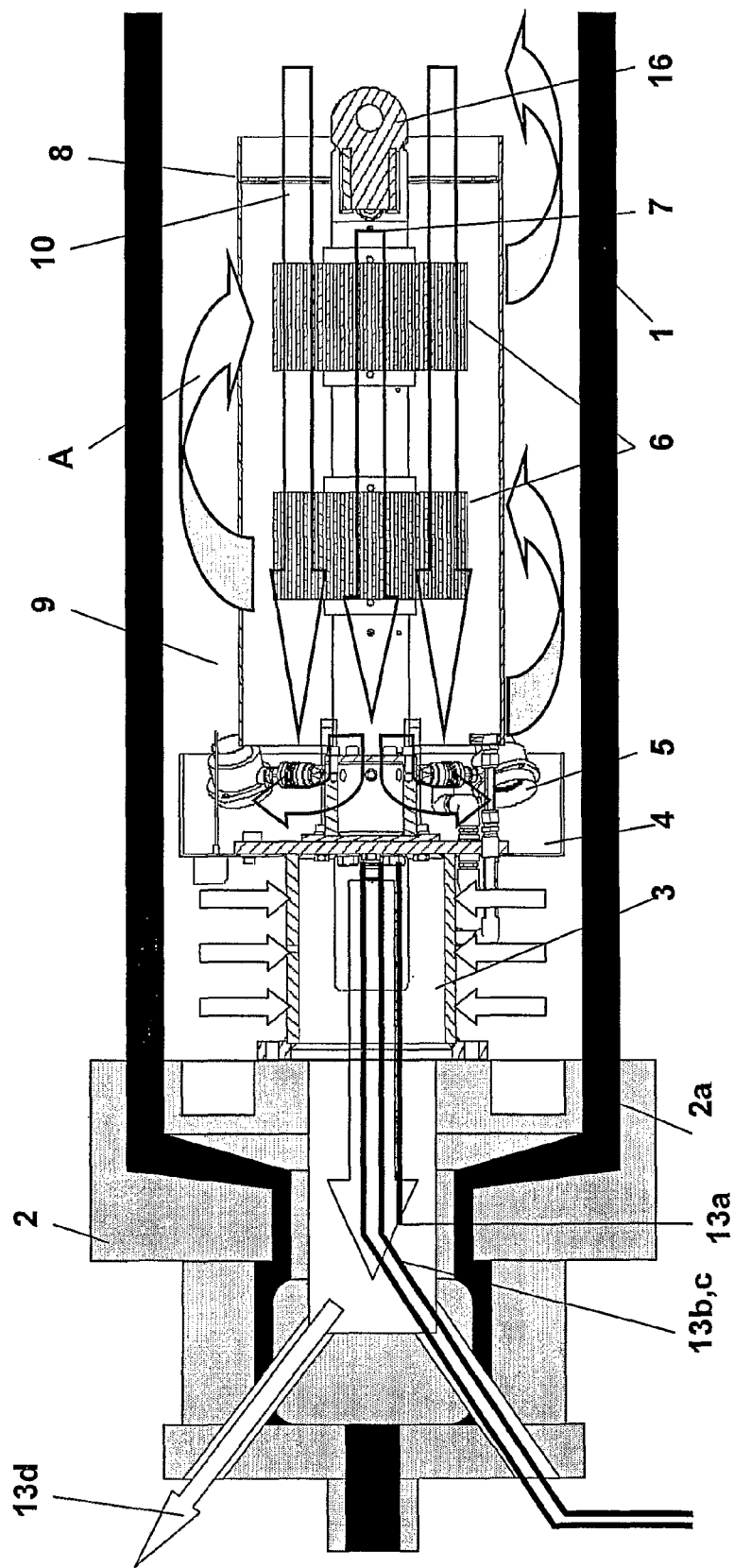
FIG. 1 shows a principle sketch of the extrusion of a thermoplastics pipe carried out simultaneously with internal cooling of the pipe.

Besides external cooling of a thermoplastics pipe also internal cooling thereof is carried out according to the invention in connection with extrusion of the thermoplastics pipe 1 on exiting an extruding tool 2, whereby the molten pipe profile is lead through a calibrator or one and several cooling baths, which procedure enables faster cooling of the thermoplastics pipe 1 and thereby higher extrusion rate, simultaneously decreasing internal stresses frozen in the pipe wall. According to the invention the internal cooling is carried out using a device arranged in the front of the extruding tool 2 coaxially with its ring-shaped slot 2a, comprising a cylindrical connecting piece 3, a guide bush 4 which is adapted to the inner dimension of the thermoplastics pipe 1 and closed against the extruding tool 2, a plurality of elements 5 for directing cooling air jets essentially tangentially towards the inner surface of the thermoplastics pipe, which elements are mounted annularly and rotatably inside the cylindrical side wall of the guide bush 4 and are in the shown embodiment in the form of air activators 5 of ejector type, a cooling equipment 6, comprising at least one heat exchanger 6 arranged in a central frame 7 projecting from the connecting piece 3 and the guide bush 4, a cylindrical protecting pipe 8 which encircles said heat exchangers 6 and is arranged to form a ring-shaped flow channel 9 along the inner surface of the thermoplastics pipe 1 and a central return channel 10, ending in the guide bush 4, for the cooling air flowing through the ring-shaped flow channel 9 and being returned to the air actuators 5 influenced by the suction effect of the air activators 5 and being simultaneously cooled during passage through one or several heat exchangers 6 provided in the return channel 10, in order to be redirected towards the inner wall of the thermoplastics pipe 1.

The air activators 5 are arranged at the ends of telescopic shafts 11 projecting radially from the central frame 7 of the device, which shafts enable radial movement and rotation of the air activators 5 around their telescopic shafts 11. In order to achieve as effective and uniform cooling of the thermoplastics pipe 1 and complete mixing of the air inside the thermoplastics pipe as possible, the air activators 5 are turned relative to the longitudinal axis of the device and of the thermoplastics pipe 1 so that the cooling air flowing out of the air activators 5 will flow spirally through the ring-shaped flow channel 9 between the protecting pipe 8 and the inner surface of the thermoplastics pipe 1 as shown by curved arrows A in FIG. 1.

In order to control and to maintain the cooling process inside the thermoplastics pipe 1, an external control unit 12 shown in FIGS. 3a and 3b may be used. The controller 12 is intended to be connected to the device via pipe lines 31a d (schematically shown in FIG. 1), which are lead through the connecting piece 3 of the device and the extruding tool 2. In the control unit, there are means 14a to receive pressurized air, means 14b for cleaning, primarily filtering, said pressurized air, means 14c for regulating the supply of pressurized air via air outlets 14d into the air activators 5 of the device as well as for pressurizing the interior of the thermoplastics pipe 1 in connection with possible pressure calibration, means 14e to receive cooling water from the heat exchangers 6 of the device, temperature regulating 14f for cooling water, a flow controller 14g for the cooled cooling water to be lead to the heat exchangers 6 of the device as well as a circulation pump 14h for the cooling water. In order to enable fast and simple adapting of the device to internal cooling of thermoplastics pipes of different sizes, the guide bush in the embodiment shown in FIG. 2a-2c is made of two adapter plates 4a which can easily be connected and disconnected to and from the device. When the device is to be adapted to internal cooling of a thermoplastics pipe 1 of larger dimension, the ordinary adapter plates 4a are decoupled and replaced with a pair of larger adapter plates 4b or 4c, whereafter the air activators 5 are by means of the telescopic shafts 11 radially moved outwards to the cylindrical side wall of the new guide bush 4, and a second protecting pipe 8a or 8b is detachably mounted on the top of the ordinary protecting pipe 8 of the device, which second protecting pipe 8a or 8b comprise means 15a or 15b for closing a ring-shaped space 9a or 9b in order to force the cooling air circulating in thermoplastics pipe 1 to flow back to the air activators 5 through the heat exchangers 6 and not past by the heat exchangers 6 via the formed ring-shaped slots 9a or 9b outside the ordinary protecting pipe 8.

Due to the fact that the device, is, in addition to the ordinary adapter plates 4a and protecting pipe 8, provided with two additional sets of adapter plates 4b, 4c and protecting pipes 8a, 8b adapted to medium-sized and large-sized thermoplastics pipes, respectively, the device can be used for the whole scale of pipes to be manufactured.

Figure 2D:
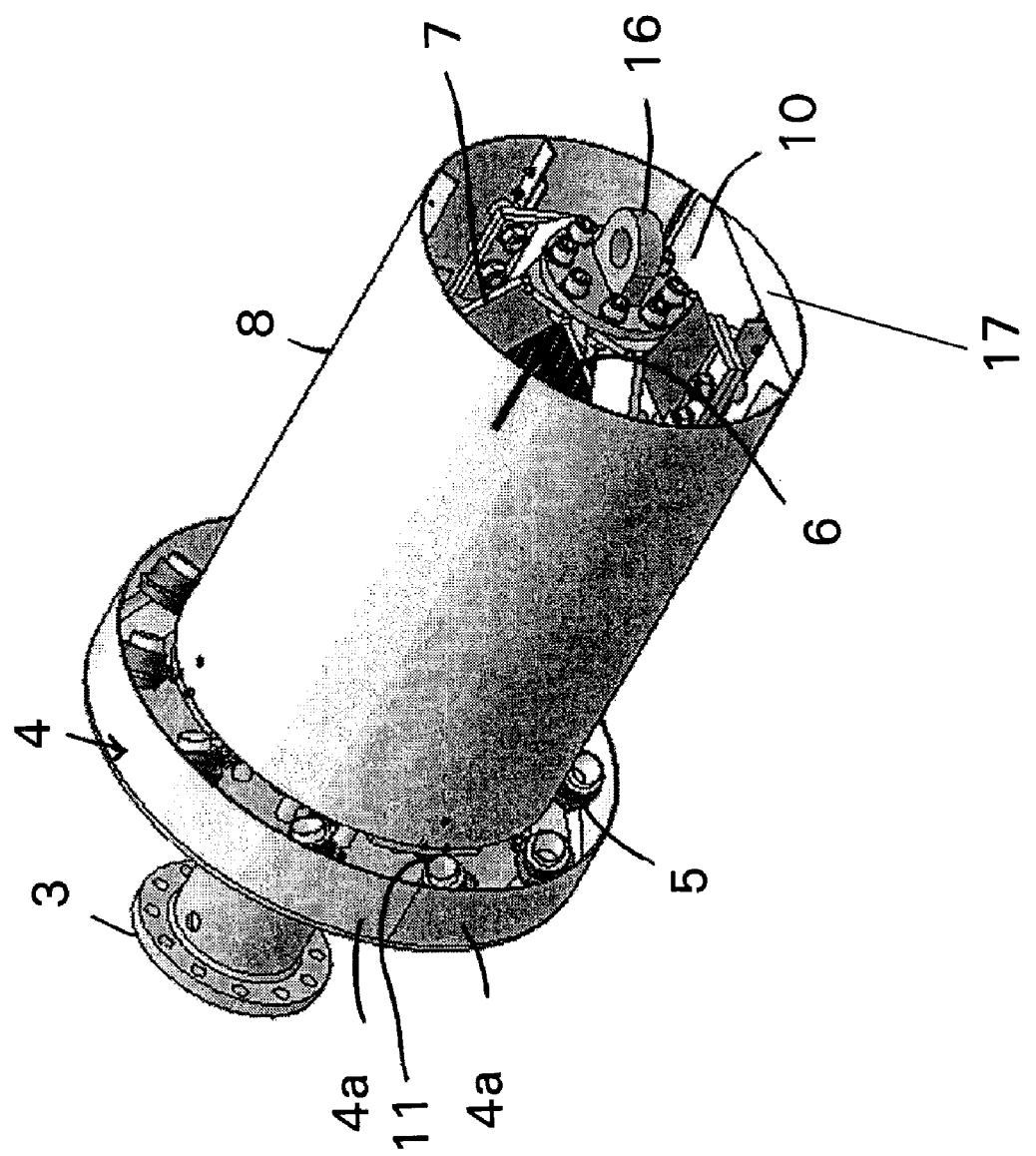

As shown in FIG. 2d, the protecting pipe 8 may be provided in the lower part of its front end with a drip pan 17 to prevent condensate from the plastics from dropping down onto the inner wall of the pipe 1.

In internal cooling carried out in connection with vacuum calibration, the free end of the pipe is fully open, but in order to carry out the internal cooling also in connection with pressure calibration the front end of the device is provided with means connected to a wire fixed to a pressure plug intended to be located farther ahead in the thermoplastics pipe 1 being manufactured. The front end of the device is provided with an organ (16) for coupling the wire fixed to the pressure plug intended to be located farther ahead in the thermoplastics pipe when the internal cooling is carried out during pressure calibration. During the pressure calibration an overpressure is maintained inside the thermoplastics pipe by supplying pressurized air simultaneously as the space inside the thermoplastics pipe 1 is brought into contact with an adjustable outlet valve 14i arranged in the control unit 14 for discharging excessive cooling air via a pipe drawn through the connecting piece 4 and the extruding tool 2, by which outlet valve 14i the pressure is balanced inside the thermoplastics pipe 1.

The invention claimed is:

1. A device for cooling an extruded thermoplastics pipe, which on exiting an extruding tool is arranged to pass through a calibrator and one or several cooling baths, which device is connected to the extruding tool coaxially with a ring-shaped slot of the extruding tool, and comprises a cylindrical connecting piece, a guide bush which is adapted to the inner dimension of the thermoplastics pipe and closed against the extruding tool, a plurality of means mounted annularly inside the cylindrical side wall of the guide bush in order to direct gaseous cooling medium jets mainly tangentially towards the inner surface of the thermoplastics pipe, a cylindrical protecting pipe arranged to form a ring-shaped flow channel along the inner surface of the thermoplastics pipe, and a central return channel, ending in the guide bush, for a part of the cooling medium flown through the ring-shaped flow channel to be returned to said means influenced by suction effect of the cooling medium flows in order to be redirected towards the inner wall of the thermoplastics pipe, characterized in that the cooling medium is air, whereby a cooling equipment is arranged in the return channel, said cooling equipment comprising at least one heat exchanger mounted in a central frame projecting from the connecting piece and the guide bush, and that each of the means for directing the cooling air flows are rotatably mounted in its own telescopic shaft projecting essentially in a radial direction from the central frame of the device enabling radial movement and rotation of each element around its telescopic shaft.

2. The device according to claim 1, characterized in that said elements are adjustable relative to the longitudinal axis of the device so that the cooling air flows spirally through the ring-shaped flow channel between the protecting pipe and the inner pipe wall to be cooled.

3. The device according to claim 2, characterized in that said elements for directing the cooling air flows are in the form of air activators of ejector type.

4. The device according to claim 1, characterized in that an external control unit is arranged to control the operations of the device via pipe lines lead through the connecting piece of the device and the extruding tool, which control unit comprises means to receive pressurized air, means for cleaning the same, means to control the supply of pressurized air to the means directing the cooling air flows and means for cooling as well as means for controlling the flow of cooling medium preferably water, to the heat exchangers of the device for cooling the cooling air circulating in the pipe.

5. The device according to claim 2, characterized in that the guide bush of the device is made of two or more easily replaceable segments or adapter plates.

6. The device according to claim 5, characterized in that the device is provided with a second larger guide bush and a second protecting pipe, and that the device is applicable to internal cooling of larger-sized thermoplastics pipes by radial movement of the elements directing the cooling air flows, by replacing the guide bush with said second larger guide bush, and by detachably applying said second protecting pipe on top of the ordinary protecting pipe of the device, which second protecting pipe comprises means for closing the ring-shaped space formed between the ordinary protecting pipe and said other protecting pipe.

7. The device according to claim 6, characterized in that the device is provided with a first set of adapter plates for thermoplastics pipes of a smallest size, a second set of adapter plates and a related second protecting pipe for medium-sized thermoplastics pipes and a third set of adapter plates and a related protecting pipe for large size thermoplastics pipes and in that the first set of adapter plates is replaceable with said second set of adapter plates or said third set of adapter plates.

8. The device according to claim 3, characterized in that the front end of the device is provided with an organ for coupling a wire fixed to a pressure plug intended to be located farther ahead in the thermoplastics pipe when the internal cooling is carried out during pressure calibration, whereby the space inside the thermoplastics pipe communicates with an adjustable outlet valve for excessive cooling air via a pipe drawn through the connecting piece of the device and the extruding tool.

9. The device according to claim 1, characterized in that below front end of the protecting pipe a drip pan is provided preventing condensate of the plastics from dropping down onto the inner surface of the pipe.

* * * * *